United States Patent [19]

Ozaki

[11] Patent Number: 4,481,923
[45] Date of Patent: Nov. 13, 1984

[54] THROTTLE VALVE CONTROL APPARATUS IN INTERNAL COMBUSTION ENGINE

[75] Inventor: Syunzaburo Ozaki, Sakado, Japan

[73] Assignee: Honda Giken Kogyo Kabushiki Kaisha, Tokyo, Japan

[21] Appl. No.: 475,926

[22] Filed: Mar. 16, 1983

[30] Foreign Application Priority Data

Mar. 17, 1982 [JP] Japan .................................. 57/41899

[51] Int. Cl.³ ............................................. F02M 3/04
[52] U.S. Cl. ................................... 123/320; 123/325
[58] Field of Search ....... 123/320, 327, 328, DIG. 11, 123/324, 325, 332, 371, 376; 261/DIG. 19

[56] References Cited

U.S. PATENT DOCUMENTS 3,682,148 8/1972 Harrison et al. .................... 123/328
3,788,288 1/1974 Harrison et al. .................... 123/328
4,178,890 12/1979 Yamabe et al. ..................... 123/320

Primary Examiner—William A. Cuchlinski, Jr.
Attorney, Agent, or Firm—Armstrong, Nikaido, Marmelstein & Kubovcik

[57] ABSTRACT

A throttle valve control apparatus having a valve closing device for closing the throttle valve beyond the idling position thereof. The valve closing device is controlled by a control mechanism which is responsive to engine speed and includes an engine speed sensor. The closing device is operated at the time of deceleration of the engine from the condition that the engine speed is above a predetermined minimum ON speed and is released from operation when the engine speed is lowered to a predetermined OFF speed which is near the idling speed. The ON speed is set to be above an upper-limit of an adjustment error range predetermined about the actual idling speed.

2 Claims, 3 Drawing Figures

THROTTLE VALVE CONTROL APPARATUS IN INTERNAL COMBUSTION ENGINE

BACKGROUND OF THE INVENTION

This invention relates to a throttle valve control apparatus in an internal combustion engine mounted on a motorcar or the like.

Known throttle valve control apparatuses are often provided with a valve closing means for closing a throttle valve of an engine beyond its idling position. The valve closing means is arranged to operate at the time of deceleration for effecting a decrease in the amount of fuel consumption and improving the fuel cost economy.

It has been usual with this type of apparatus that the valve closing means is controlled in operation by a control means which is responsive to an engine speed signal. The valve closing means is operated at the time of deceleration from such a condition that the engine speed is above a predetermined ON speed, and is released from operation when the engine speed is lowered to a predetermined OFF speed which is near an idling speed thereof, so that the throttle valve is returned to its idling position for preventing the engine speed from lowering below the idling speed. It has been general, in such a case, that the difference between the OFF speed and the ON speed is set to be several 10-100 r.p.m. This is because of the necessary minimum limit of hysteresis required for discrimination of the engine speed sensor. This, however, creates certain inconveniences as described below.

Namely, the actual idling speed provides a dispersion thereof even after adjustment. The upper limit of the adjustment error range thereof is about 400 r.p.m. in relation to a prescribed idling speed required for the engine. For instance, in respect of an engine of which the prescribed idling speed is 650 r.p.m., if the OFF speed thereof is set to be 800 r.p.m. and when the ON speed thereof is set to be 900 r.p.m., having such a hysteresis as described above, it often happens that the set ON speed becomes below the actual idling speed of the engine. Consequently, when, after releasing of the valve closing means from its operation, the throttle valve is returned to its idling position to effect idling, the engine speed rises above the ON speed, and thereby the valve closing means is returned to its operative condition from its released inoperative condition to close the throttle valve again and thereby the engine speed is lowered again to release the valve closing means. In this way, the above operations are repeated to generate such a self-excited vibration as shown by a curve b in FIG. 3. If, in such a case, the OFF speed is set to be near the prescribed idling speed in order to improve the fuel cost economy, the self-excited vibration becomes more remarkable.

This invention has as an object the elimination of any of the above-described self-excited vibrations. This is achieved in an apparatus having a valve closing means for closing a throttle valve of an internal combustion engine beyond an idling position thereof, wherein the valve closing means is controlled in operation by a control means which is responsive to an engine speed and has an engine speed sensor. The valve closing means is operated at the time of deceleration from the condition that the engine speed is above a predetermined ON speed, and is released from operation when the engine speed is lowered to a predetermined OFF speed which is near an idling speed thereof. The invention is characterized in that the ON speed is set to be above an upper limit of an adjustment error range predetermined about the actual idling speed.

BRIEF DESCRIPTION OF THE DRAWINGS

The above and other objects and the attendant advantages of the present invention will become readily apparent by reference to the following detailed description when considered in conjunction with the accompanying drawings, wherein.

DETAILED DESCRIPTION OF A PREFERRED EMBODIMENT

Figure 1:
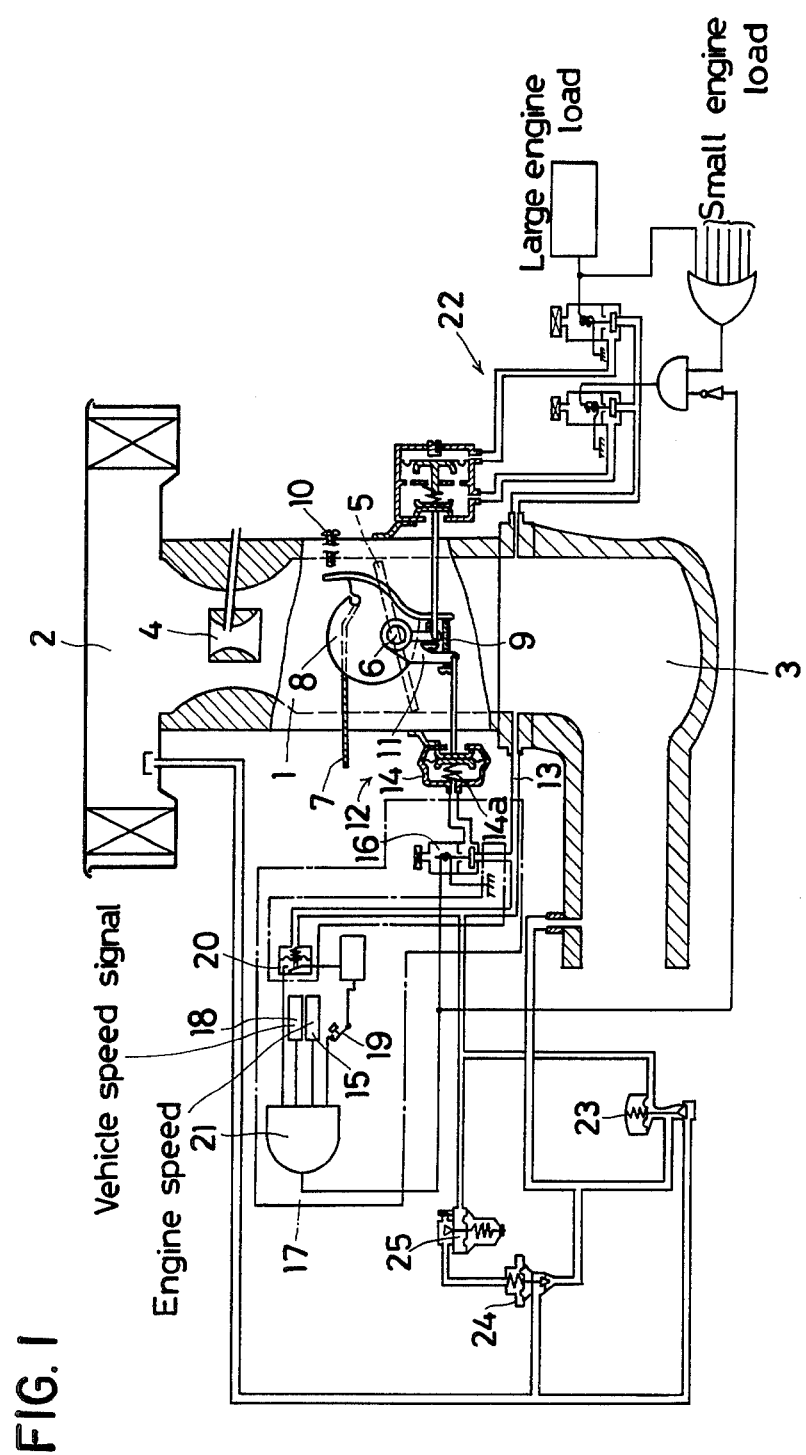
FIG. 1 is a system diagram showing one example of this invention.

One embodying example of this invention will now be explained with reference to the accompanying drawings:

Referring to the drawings, an intake passage 1 of an internal combustion engine is provided with a carburetor 4 and a throttle valve 5 on the downstream side thereof disposed between an air cleaner 2 provided on the upstream end portion of the intake passage 1 and an intake manifold 3 provided on the downstream end portion.

The throttle valve 5 is turnable in the intake passage 1 through a rotary shaft 6. A lever member 8 having a throttle wire 7 attached thereto and connected to an acceleration pedal (not shown) is fixed to the rotary shaft 6 so that if the wire 7 is pulled, the valve 5 may be turned in an opening direction (counter-clockwise in the drawings), and if the wire 7 is released, the valve 5 may be turned in its closing direction (clockwise) by the action of a return spring (not shown).

Additionally, the valve 5 is so arranged that the turning thereof in its closing direction may be stopped at a predetermined idling position thereof by an idling stopper 9 arranged to be brought into abutment with the lower member 8. Additionally, the stopper 9 is arranged so that at the time of deceleration, it is retracted from its operative position to its inoperative position, that is, to the left in the drawing. In this manner, the valve 5 is allowed to turn to a closed-valve position thereof set in position by a closed-valve stopper 10.

The idling stopper 9 is attached to a swing arm 11 supported swingably on the foregoing rotary shaft 6 so that the same may be moved to advance and retreat between its operative position and its inoperative position by the swing movement of the arm 11. The valve closing means 12 for allowing the throttle valve 5 to be brought to its closed-valve position by retreating the stopper 9 to its inoperative position, is constructed as described below.

Namely, the valve closing means 12 includes the arm 11 connected to a negative pressure actuator 14 arranged to be applied with a negative pressure in the intake passage 1 through a negative pressure passage 13. The actuator 14 controlled in operation by a control means 17 comprising an engine speed sensor 15 and a control valve 16 interposed in the negative pressure passage 13 and arranged to open and close the passage 13 by an engine speed signal supplied from the sensor 15. Thus, the valve closing means 12 may be controlled to be changed over between such an operative condition thereof that, when the control valve 16 is opened, the negative pressure actuator 14 is operated by the negative pressure generated in the intake passage 1 at the time of deceleration and thereby the idling stopper 9 is retreated through the arm 11 to its inoperative position and such a removal from operation condition thereof that, when the control valve 16 is closed, the application of the negative pressure to the negative pressure actuator 14 is shut off and thereby the idling stopper 9 is advanced to its operative position by the action of a return spring 14a provided in the actuator 14.

The engine speed sensor 15 is arranged so that a low level OFF signal is generated therefrom when the engine speed is lowered to a predetermined OFF speed, and a high level ON signal is generated therefrom when the engine speed is increased to a predetermined ON speed. The ON-OFF signal is arranged to be inputted to an AND circuit 21 which is arranged to be inputted with a vehicle speed signal from a vehicle speed sensor 18. A further ON-OFF signal of a clutch switch 19 moved with a clutch pedal (not shown) and a still further ON-OFF signal of a negative pressure switch 20 arranged to be applied with the negative pressure in the intake passage 1. Thus, the control valve 16 may be given the engine speed signal from the engine speed sensor 15 under such a predetermined driving condition that the vehicle speed is above a predetermined value, the clutch switch 19 is in its ON condition (the clutch pedal is in its inoperative condition) and the negative pressure switch 20 is in its ON condition. Consequently, the control valve 16 is closed by the OFF signal and is opened by the ON signal. In this case, it is preferable for improving the fuel cost economy, that the foregoing OFF speed be set to be near a prescribed idling speed of the engine, and it is general for practical use that the same is set to be higher by about 100–300 r.p.m. than the prescribed idling speed in view of return characteristics or the like thereof. Therefore, the OFF speed is set to be about 800 r.p.m. when the prescribed idling speed is 650 r.p.m., for instance.

Figure 2:
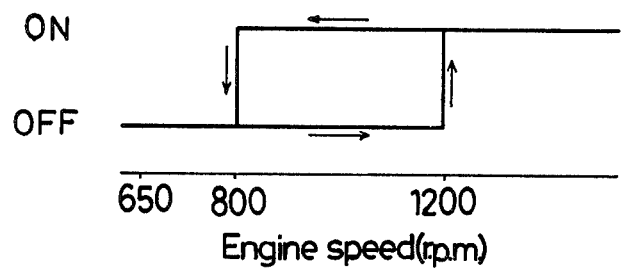
FIG. 2 is a diagram showing a hysteresis between ON-OFF engine speeds by a control means thereof.

According to this invention, the ON speed is set to be higher than the upper limit of the adjustment error range predetermined about the actual idling speed of the engine. More in detail, it often happens that the upper limit of the adjustment error range becomes about 400 r.p.m. higher than the prescribed idling speed. Therefore, when the prescribed idling speed is 650 r.p.m., the ON speed is set to be 1200 r.p.m. or so, for instance, which is somewhat higher than the upper limit of the adjustment error range. Thus, the hysteresis between the OFF signal and the ON signal becomes as shown in FIG. 2.

Next, the operation of the apparatus will be explained as follows:

If deceleration is effected under the foregoing predetermined driving condition, from the condition that the engine speed before the deceleration is above 1200 r.p.m., the high level ON signal is generated from the engine speed sensor 15 to open the control valve 16. The valve closing means 12 is operated as described above to bring the throttle valve 5 to the closed-valve position.

If, thereafter, the engine speed is reduced to 800 r.p.m., the low level OFF signal is generated from the engine speed sensor 15 to close the control valve 16. The valve closing means 12 is then removed from its operation to bring back the throttle valve 5 to the idling position.

When the actual idling speed of the engine corresponding to the idling position is above 800 r.p.m., it causes an increase in the engine speed, and this is not especially different from that in the conventional apparatus.

Figure 3:
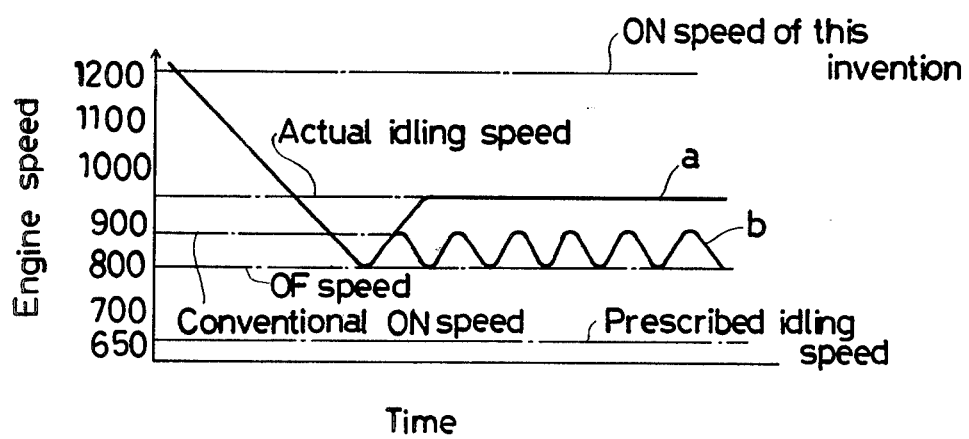
FIG. 3 is a characteristic diagram thereof.

According to this invention, however, since the ON speed is set to be 1200 r.p.m., which is higher than the upper limit of the adjustment error range predetermined about the actual idling speed as described above, the idling speed does not go beyond the ON speed. Consequently, the valve closing means 12 can be kept in its released condition from operation, and the engine speed becomes constant after increased to the idling speed as shown by a line a in FIG. 3. Thus, a self-excited vibration does not result in the conventional apparatuses as shown by the curbe b in FIG. 3.

Further, in the case of a motorcar of fluid clutch type, after the throttle valve 5 is returned to the idling position at the OFF speed, it often happens that the engine speed is increased by about 200–300 r.p.m. by transmission of a reverse load through the fluid clutch. Consequently, if the hysteresis between the OFF speed and the ON speed is small, the self-excited vibration results. To prevent this, it is preferrable that the hysteresis therebetween be above 400 r.p.m.

If, furthermore, the ON speed is set to be too high, the valve closing means 12 is not operated at the time of deceleration from a comparatively low speed. To prevent this, it is preferrable that when the OFF speed is set to be for instance, 800 r.p.m. as mentioned before, the ON speed be set to be 1200–1600 r.p.m. with the hysteresis being 400–800 r.p.m.

Referring to the drawings, an idle-speed increasing mechanism 22 for increasing an idling open degree according to increase in a load at the time of idling, an anti-afterburning valve 23 and a secondary air valve 24 which are disposed in parallel one with another and arranged to introduce a secondary air, and a control valve 25 for controlling the secondary air valve 24 can be provided.

Thus, according to this invention, the ON speed of the engine at which the valve closing means is brought into its operation condition is set to be higher than the upper limit of the adjustment error range predetermined about the actual engine idling speed, so that even after the actual idling speed is made much higher, due to the dispersion, than the OFF speed at which the valve closing means is removed from its operation condition, there is not caused a self-excited vibration. Additionally, if the OFF speed is set to be near a prescribed idling speed of the engine, the fuel cost economy can be improved.

It is readily apparent that the above-described throttle valve control apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A throttle valve control apparatus in an internal combustion engine having a valve closing means for closing a throttle valve of an internal combustion engine beyond an idling position thereof, and the valve closing means being controlled in operation by a control means responsive to an engine speed and having an engine speed sensor, said valve closing means being operated at the time of deceleration from the condition that the engine speed is above a predetermined ON speed, and is released from operation when the engine speed is lowered to a predetermined OFF speed which is near an idling speed thereof, characterized in that the ON speed is set to be above the upper limit of an adjustment error range predetermined about the actual idling speed.

2. A throttle valve control apparatus of claim 1, wherein when the engine has a prescribed idling speed of 650 r.p.m., the OFF speed is 800 r.p.m. and the ON speed is 1200–1600 r.p.m.

* * * * *